United States Patent Office.

DANIEL ARNDT, OF CLEVELAND, OHIO.

Letters Patent No. 106,911, dated August 30, 1870; antedated August 25, 1870.

IMPROVED CEMENT.

The Schedule referred to in these Letters Patent and making part of the same.

*To all whom it may concern:*

Be it known that I, DANIEL ARNDT, of Cleveland, in the county of Cuyahoga and in the State of Ohio, have invented certain new and useful Improvements in Cement; and do hereby declare that the following is a full, clear, and exact description thereof.

The nature of my invention consists in the admixture of a cheap and durable cement, and the manner of keeping the same for any length of time.

In order to enable others skilled in the art to which my invention appertains to make and use the same, I will now proceed to describe the manner in which my cement is or may be made and kept ready for use.

The cement consists of curd, slaked lime, and vinegar. The curd is made of skimmed milk; poor milk is the best, without the least particle of cream or grease. The milk is made hot, so that the curd will settle to the bottom; it is then put into a strainer, and drained until it is dry, and then taken out and put on a board, and ground the same as paint. To every pint of curd is added about one table-spoonful of common slaked lime and the mixture, ground together, adding a little vinegar, until it is thin enough for use.

This cement is put on with a brush, the same as glue, and will take from two to three hours to dry. Neither boiling water nor boiling lye will dissolve the joints that are put together with it.

It costs less than the common glue in general use, and is easy to be had in all parts of the country, and is more durable and perfectly water-proof.

The finest glass or ware of any kind can be cemented without showing the defect. The ends of two pieces of wood can be cemented with it, which glue could not hold.

Any quantity of the milk-curd can be put up in boxes or kegs, to be kept for any length of time, by covering the curd with dry salt, say about one inch thick, to keep it from molding. By this means the curd will keep for any desired length of time.

I mix the cement with cider vinegar, about one wine-glassful to one quart of cement, when it will be kept in a liquid state for any desired length of time. A great many kinds of acids would keep the cement soft and thin, but cider vinegar being the cheapest, I prefer to use that.

A very great advantage in using this cement is that it can be prepared or mixed without fire or heat, thus doing away with the danger and inconvenience of having a fire, especially in the summer time, in cabinet-shops, where there are a great many shavings.

I do not confine myself to the exact proportions of the ingredients herein mentioned, as they may possibly be varied somewhat.

Having thus fully described my invention,

What I claim as new, and desire to secure by Letters Patent, is—

A cement, composed of curd, slaked lime, and vinegar, as herein set forth.

In testimony that I claim the foregoing, I have hereunto set my hand this 25th day of January, 1870.

DANIEL ARNDT.

Witnesses:
E. F. HINSDALE,
JNO. K. CORWIN.